(12) United States Patent
Kaltenbach et al.

(10) Patent No.: US 10,486,518 B2
(45) Date of Patent: Nov. 26, 2019

(54) GEARBOX FOR A HYBRID VEHICLE, DRIVETRAIN HAVING A GEARBOX OF SAID TYPE, AND METHOD FOR OPERATING THE SAME

(71) Applicant: ZF Friedrichshafen AG, Friedrichshafen (DE)

(72) Inventors: Johannes Kaltenbach, Friedrichshafen (DE); Christian Mittelberger, Ravensburg (DE); Stefan Renner, Bodman-Ludwigshafen (DE); Stefan Blattner, Vogt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 30 days.

(21) Appl. No.: 15/773,004

(22) PCT Filed: Nov. 2, 2016

(86) PCT No.: PCT/EP2016/076417
§ 371 (c)(1),
(2) Date: May 2, 2018

(87) PCT Pub. No.: WO2017/076899
PCT Pub. Date: May 11, 2017

(65) Prior Publication Data
US 2018/0319267 A1 Nov. 8, 2018

(30) Foreign Application Priority Data
Nov. 3, 2015 (DE) .......... 10 2015 221 514

(51) Int. Cl.
*B60K 6/365* (2007.10)
*B60K 6/48* (2007.10)
(Continued)

(52) U.S. Cl.
CPC ............... *B60K 6/365* (2013.01); *B60K 6/48* (2013.01); *B60K 6/547* (2013.01);
(Continued)

(58) Field of Classification Search
CPC .......... B60K 6/365; B60K 6/48; B60K 6/547; B60K 2006/4816; F16H 2003/007
See application file for complete search history.

(56) References Cited

U.S. PATENT DOCUMENTS 7,992,458 B2   8/2011   Krieger et al.
8,663,065 B2   3/2014   Kaltenbach
(Continued)

FOREIGN PATENT DOCUMENTS

DE   10 2005 043 703 A1   3/2007
DE   10 2009 046 620 A1   5/2011
(Continued)

OTHER PUBLICATIONS

German Search Report Corresponding to 10 2015 221 487.7 dated Sep. 22, 2016, (9 pages).
(Continued)

*Primary Examiner* — Mark J Beauchaine
(74) *Attorney, Agent, or Firm* — Davis & Bujold PLLC; Michael J. Bujold

(57) ABSTRACT

A hybrid vehicle transmission (1) having internal combustion engine (8) and electric machine (5). The transmission (1) comprises main transmission (HG) with two parallel partial transmissions; output shaft (4); first (R1), second (R2), third (R3), fourth (R4) and output constant (R5) gear planes each comprising a fixed gear on countershaft (VW) and respective meshing loose gear; first (A), second (B), third (C), fourth (D), fifth (E), sixth (F), seventh (G) and eighth (H) shift elements. Whenever eighth shift element (H) is engaged, the loose gear of fifth gear plane (R5) is engaged
(Continued)

with the output shaft (4) of the main transmission (HG), whenever the seventh shift element (G) is engaged, loose gear of fourth gear plane (R4) is engaged with the output shaft (4), and whenever the sixth shift element (F) is engaged, loose gear of fourth gear plane (R4) is engaged with the first transmission input shaft (2).

17 Claims, 7 Drawing Sheets

(51) Int. Cl.
  *B60K 6/547* (2007.10)
  *F16H 37/04* (2006.01)
  *F16H 3/00* (2006.01)
(52) U.S. Cl.
  CPC .... *B60K 2006/4816* (2013.01); *F16H 37/046* (2013.01); *F16H 2003/007* (2013.01); *Y02T 10/6221* (2013.01); *Y02T 10/6256* (2013.01)

(56) References Cited

U.S. PATENT DOCUMENTS

| | | |
|---|---|---|
| 8,684,875 B2 | 4/2014 | Kaltenbach et al. |
| 8,911,315 B2 | 12/2014 | Kaltenbach et al. |
| 8,961,345 B2 | 2/2015 | Kaltenbach et al. |
| 9,180,872 B2 | 11/2015 | Lee et al. |
| 9,403,428 B2 | 8/2016 | Glueckler |
| 9,528,583 B2 | 12/2016 | Lübke et al. |
| 9,541,180 B2 | 1/2017 | Kaltenbach |
| 9,546,721 B2 | 1/2017 | Mittelberger et al. |
| 2012/0216639 A1 | 8/2012 | Renner |
| 2012/0240723 A1* | 9/2012 | Gluckler .............. B60K 6/36 74/661 |
| 2013/0096761 A1 | 4/2013 | Kuroda et al. |
| 2014/0038762 A1 | 2/2014 | Wechs |
| 2014/0150604 A1 | 6/2014 | Kaltenbach |
| 2015/0184731 A1 | 7/2015 | Lee et al. |
| 2015/0226324 A1 | 8/2015 | Gluckler et al. |
| 2015/0267778 A1 | 9/2015 | Peterson et al. |
| 2015/0375736 A1 | 12/2015 | Kaltenbach et al. |

FOREIGN PATENT DOCUMENTS

| | | |
|---|---|---|
| DE | 10 2009 054 752 A1 | 6/2011 |
| DE | 10 2010 030 571 A1 | 12/2011 |
| DE | 10 2010 030 573 A1 | 12/2011 |
| DE | 10 2010 030 575 A1 | 12/2011 |
| DE | 10 2010 063 582 A1 | 6/2012 |
| DE | 10 2011 005 531 A1 | 9/2012 |
| DE | 10 2011 080 069 A1 | 1/2013 |
| DE | 10 2013 105 785 A1 | 12/2013 |
| DE | 10 2012 213 711 A1 | 2/2014 |
| DE | 10 2012 217 503 A1 | 3/2014 |
| DE | 10 2012 218 367 A1 | 4/2014 |
| DE | 10 2012 220 063 A1 | 5/2014 |
| DE | 10 2012 220 829 A1 | 5/2014 |
| DE | 10 2012 221 889 A1 | 6/2014 |
| DE | 10 2013 200 158 A1 | 7/2014 |
| DE | 10 2013 211 969 A1 | 1/2015 |
| DE | 10 2013 222 510 A1 | 5/2015 |
| DE | 10 2014 202 381 A1 | 8/2015 |
| EP | 2 457 760 A2 | 5/2012 |
| WO | 2012/084330 A1 | 6/2012 |
| WO | 2015/142265 A1 | 9/2015 |

OTHER PUBLICATIONS

German Search Report Corresponding to 10 2015 221 490.7 dated Sep. 23, 2016, (9 pages).
German Search Report Corresponding to 10 2015 221 499.0 dated Jul. 15, 2016, (8 pages).
German Search Report Corresponding to 10 2015 221 514.8 dated Sep. 29, 2016, (9 pages)
German Search Report Corresponding to 10 2015 221 493.1 dated Sep. 27, 2016, (9 pages).
International Search Report Corresponding to PCT/EP2016/074680 dated Jan. 26, 2017, (7 pages).
International Search Report Corresponding to PCT/EP2016/073763 dated Dec. 7, 2016, (7 pages).
International Search Report Corresponding to PCT/EP2016/074446 dated Dec. 13, 2016, (6 pages).
International Search Report Corresponding to PCT/EP2016/076417 dated Feb. 17, 2017, (9 pages).
International Search Report Corresponding to PCT/EP2016/074687 dated Jan. 2, 2017, (7 pages).
Written Opinion Corresponding to PCT/EP2016/074680 dated Jan. 26, 2017, (7 pages).
Written Opinion Corresponding to PCT/EP2016/073763 dated Dec. 7, 2016, (8 pages).
Written Opinion Corresponding to PCT/EP2016/074446 dated Dec. 13, 2016, (7 pages).
Written Opinion Corresponding to PCT/EP2016/076417 dated Feb. 17, 2017, (8 pages).
Written Opinion Corresponding to PCT/EP2016/074687 dated Jan. 2, 2017, (5 pages).

\* cited by examiner

| | S1 | | S2 | | S3 | | S4 | | | | |
|---|---|---|---|---|---|---|---|---|---|---|---|
| | A | B | C | D | E | F | G | H | i | phi | |
| 1 | x | | x | | | | | x | 2,86 | 1,30 | 1. Gang |
| 2 (1) | x | | | | | x | | x | 2,20 | | 2. Gang (Vorwahl 1. Gang) |
| 2 (4) | | x | | | | x | | x | 2,20 | 1,30 | 2. Gang (Vorwahl 4. Gang) |
| 3 (4) | | x | | x | | | | x | 1,69 | 1,30 | 3. Gang (Vorwahl 4. Gang) |
| 4 | | x | x | | | | | x | 1,30 | 1,30 | 4. Gang |
| 5 (4) | | x | | | x | | | x | 1,00 | | 5. Gang (Vorwahl 4. Gang) |
| 5 (7) | | x | | | x | | x | | 1,00 | 1,30 | 5. Gang (Vorwahl 7. Gang) |
| 6 (7) | | x | | x | | | x | | 0,77 | 1,30 | 6. Gang (Vorwahl 7. Gang) |
| 7 | | x | x | | | | x | | 0,59 | | 7. Gang |

Fig. 7

| | S1 | | S2 | | S3 | | S4 | | S6 | | K | S5 | | i | phi | |
|---|---|---|---|---|---|---|---|---|---|---|---|---|---|---|---|---|
| | A | B | C | D | E | F | G | H | I | J | | L | S | | | |
| 1 | x | | x | | | | | x | | x | | x | | 10,63 | 1,30 | 1. Gang |
| 2 (1) | x | x | | | | x | | x | | x | | x | | 8,17 | | 2. Gang (Vorwahl 1. Gang) |
| 2 (4) | | x | | | | x | | x | | x | | x | | 8,17 | 1,30 | 2. Gang (Vorwahl 4. Gang) |
| 3 (4) | | x | | x | | | | x | | x | | x | | 6,29 | 1,30 | 3. Gang (Vorwahl 4. Gang) |
| 4 | | x | x | | | | | x | | x | | x | | 4,84 | 1,30 | 4. Gang |
| 5 (4) | x | x | | | x | | | | | x | x | x | | 3,72 | | 5. Gang (Vorwahl 4. Gang) |
| 5 (9) | x | x | | | x | | | | | x | x | x | | 3,72 | | 5. Gang (Vorwahl 9. Gang) |
| 5 (6) | x | | | | x | | | | | x | x | x | | 3,72 | 1,30 | 5. Gang (Vorwahl 6. Gang) |
| 6 (L) | x | | x | | | | | | | x | x | x | | 2,86 | | 6. Gang (GP langsam) |
| 6 (S) | x | | x | | | | | | | x | x | | x | 2,86 | 1,30 | 6. Gang (GP schnell) |
| 7 (6) | | x | | | | x | x | | | x | x | | x | 2,20 | | 7. Gang (Vorwahl 6. Gang) |
| 7 (9) | | x | | | | x | x | | | x | x | | x | 2,20 | 1,30 | 7. Gang (Vorwahl 9. Gang) |
| 8 (9) | | x | | x | | | x | | | x | | | x | 1,69 | 1,30 | 8. Gang (Vorwahl 9. Gang) |
| 9 | | x | x | | | | | | | x | | | x | 1,30 | 1,30 | 9. Gang |
| 10 (9) | | | | | x | | | | | x | | | x | 1,00 | | 10. Gang (Vorwahl 9. Gang) |
| 10 (12) | | x | | | x | | | | | x | | | x | 1,00 | 1,30 | 10.Gang (Vorwahl 12. Gang) |
| 11 (12) | | x | | x | | | | | | x | | | x | 0,77 | 1,30 | 11. Gang (Vorwahl 12. Gang) |
| 12 | | x | x | | | | | | | x | | | x | 0,59 | | 12.Gang |

| | S1 | | S2 | | S3 | | S4 | | S6 | | | S5 | | i | phi | |
|---|---|---|---|---|---|---|---|---|---|---|---|---|---|---|---|---|
| | A | B | C | D | E | F | G | H | I | J | K | L | S | | | |
| 1 | x | | x | | | | | | x | | | x | | 10,63 | 1,30 | 1. Gang |
| 2 (1) | x | | | | | | | x | x | | | x | | 8,17 | | 2. Gang (Vorwahl 1. Gang) |
| 2 (4) | | x | | | | x | | x | x | | | x | | 8,17 | 1,30 | 2. Gang (Vorwahl 4. Gang) |
| 3 (4) | | x | | x | | x | | x | x | | | x | | 6,29 | 1,30 | 3. Gang (Vorwahl 4. Gang) |
| 4 | | x | x | | | | | x | x | | | x | | 4,84 | 1,30 | 4. Gang |
| 5 (4) | x | x | | | x | | | x | x | | | x | | 3,72 | | 5. Gang (Vorwahl 4. Gang) |
| 5 (9) | | x | | | x | | | | x | | x | x | | 3,72 | 1,30 | 5. Gang (Vorwahl 9. Gang) |
| 5 (6) | x | | | | x | | | | x | | x | x | | 3,72 | | 5. Gang (Vorwahl 6. Gang) |
| 6 (L) | x | | x | | | | | | x | | x | x | | 2,86 | 1,30 | 6. Gang (GP langsam) |
| 6 (S) | x | | x | | | x | | | x | | x | | x | 2,86 | | 6. Gang (GP schnell) |
| 7 (6) | x | | | | | x | | | x | | x | | x | 2,20 | 1,30 | 7. Gang (Vorwahl 6. Gang) |
| 7 (9) | | x | | | | | | | x | | x | | x | 2,20 | | 7. Gang (Vorwahl 9. Gang) |
| 8 (9) | | x | | x | | | | | x | | x | | x | 1,69 | 1,30 | 8. Gang (Vorwahl 9. Gang) |
| 9 | | x | x | | | | | | x | | x | | x | 1,30 | | 9. Gang |
| 10 (9) | | | | | x | | x | | x | | | | x | 1,00 | 1,30 | 10. Gang (Vorwahl 9. Gang) |
| 10 (12) | | x | | | x | | x | | x | | | | x | 1,00 | | 10. Gang (Vorwahl 12. Gang) |
| 11 (12) | | x | | x | | | x | | x | | | | x | 0,77 | 1,30 | 11. Gang (Vorwahl 12. Gang) |
| 12 | | x | x | | | | | | x | | | | x | 0,59 | | 12. Gang |

Fig. 8

GEARBOX FOR A HYBRID VEHICLE, DRIVETRAIN HAVING A GEARBOX OF SAID TYPE, AND METHOD FOR OPERATING THE SAME

This application is a National Stage completion of PCT/EP2016/076417 filed Nov. 2, 2016, which claims priority from German patent application serial no. 10 2015 221 514.8 filed Nov. 3, 2015.

FIELD OF THE INVENTION

The invention relates to a transmission for a hybrid vehicle. In addition the invention relates to a drive train having such a transmission and a method for operating such a drive train.

BACKGROUND OF THE INVENTION

Hybrid vehicles with hybrid drives are known from the prior art. Hybrid drives have two or more different drive sources, wherein to a large extent drive trains with an internal combustion engine and one or more electrical machines, as parallel hybrids or as mixed hybrids, have gained acceptance. These variants have an essentially parallel arrangement in the flow of power of the internal combustion engine and the electrical machine and thus a superposition of the driving torques and a control with purely internal combustion engine drive or purely electric motor drive is possible.

Hybrid vehicles have a transmission in addition to a hybrid drive. A transmission denotes in particular a multi speed transmission, in which a plurality of speeds, thus fixed transmission ratios between two shafts of the transmission, which can preferably be shifted automatically by shift elements. Such transmissions are used primarily in motor vehicles, in particular, also in commercial vehicles, in order to appropriately adjust the speed and torque output characteristics of the drive unit to the driving resistances of the vehicle.

From DE 10 2010 030 573 A1 a transmission for a hybrid vehicle with a main transmission having two transmission input shafts and one output shaft is known. An internal combustion engine of a hybrid drive of the hybrid vehicle can be coupled to a first transmission input shaft, while an electrical machine of the hybrid drive of the hybrid vehicle can be coupled to a second transmission input shaft of the main transmission. The main transmission has several gear planes with meshing gears and several shift elements, which are combined into double shift elements.

The transmission of DE 10 2010 030 573 A1 enables a charge depletion mode, even without a separating clutch between the internal combustion engine and first transmission input shaft. Further, a charge depletion mode in reverse with a reversal of the direction of rotation of the electric machine is possible. In hybrid operation, an electric traction force support is possible during gear changes.

From DE 10 2012 217 503 A1 a further transmission with two transmission input shafts and one output shaft is known. This transmission also has several gear planes with meshing gears and several shift elements combined into double shift elements.

DE 10 2010 063 582 A1 discloses a further transmission for a hybrid vehicle, wherein this transmission known from prior art also has two transmission input shafts and one output shaft. An electric machine can be coupled to one of the transmission input shafts and an internal combustion engine can be coupled to another of the transmission input shafts, wherein with this transmission an operation of the drive train is possible both in a so-called EDA operating mode and in a so-called ISG operating mode. It is possible to toggle between these two operating modes under load.

SUMMARY OF THE INVENTION

The present invention addresses the problem of creating an automated shifting transmission with electric traction force support, in which a traction force support is possible in all gears in hybrid operations with low design and construction costs and a high efficiency. In so doing, as many gears as possible should be provided, also at least one overdrive gear.

In addition the present invention addresses the problem of creating a drive train having such a transmission and a method for operating such a drive train.

This problem is solved by a transmission according to independent claims of the patent.

The transmission comprises at least one main transmission with at least the following assemblies: two partial transmissions connected in parallel with two transmission input shafts and one output shaft, the electric machine can be connected to a first transmission input shaft of a first partial transmission of the internal combustion engine and to a second transmission input shaft of a second partial transmission; a first gear plane, a second gear plane, a third gear plane, a fourth gear plane and a fifth gear serving as an output constant, wherein each gear plane has a fixed gear mounted on a countershaft and a loose gear meshing in the respective fixed gear, mounted on the first transmission input shaft or the second transmission shaft or the output shaft; a first shift element, a second shift element, a third shift element, a fourth shift element, a fifth shift element, a sixth shift element, a seventh shift element and an eighth shift element. Whenever the eighth shift element of the main transmission is engaged, the loose gear of the fifth gear plane, serving as the output constant, is coupled and rotationally fixed with the output shaft of the main transmission. Whenever the seventh shift element of the main transmission is engaged, the loose gear of the gear plane which is adjacent to the fifth gear plane, serving as the output constant, is coupled and rotationally fixed with the output shaft of the main transmission. Whenever the sixth shift element of the main transmission is engaged, the loose gear of the gear plane which is adjacent to the fifth gear plane, serving as the output constant, is coupled and rotationally fixed with the first transmission input shaft. The gear plane which is adjacent to the gear plane providing the output constant of the main transmission, can be used in two ways, namely, as a regular gear ratio and as a further output constant. Whenever the gear plane adjacent to the gear plane providing the output constant serves as a further output constant, namely, whenever the seventh shift element of the main transmission is engaged, one overdrive gear can be provided. Additional gears can be used with the transmission according to the invention, without additional gear planes having to be provided for this purpose. In particular, at least one overdrive gear can be used as well in direct gear. The or every overdrive gear can be powershifted in so doing. The shift element of the main transmission required for the or every overdrive gear can be synchronized by means of the electric machine. Preferably, whenever the fifth shift element is engaged, the first transmission input shaft is directly coupled and rotationally fixed with the output shaft of the main transmission. As a result of this a direct gear can be easily provided.

According to a further development whenever the first shift element of the main transmission is engaged, the loose gear of the first gear plane is coupled and rotationally fixed with the second transmission input shaft, wherein whenever the second shift element of the main transmission is engaged, the loose gear of the second gear plane is coupled and rotationally fixed with the second transmission input shaft, wherein whenever the third shift element of the main transmission is engaged, the first transmission input shaft and the second transmission input shaft are coupled and rotationally fixed with each other, and wherein whenever the fourth shift element of the main transmission is engaged, the loose gear of the third gear plane is coupled and rotationally fixed with the first transmission input shaft. Such a connection of the shift elements to the gear planes is especially preferred, to ensure the electric traction force support.

According to a first, preferred alternative the electric machine of the hybrid drive can be coupled and rotationally fixed with the second transmission input shaft of the main transmission with the interconnection of a planetary transmission. According to a second alternative the electric machine of the hybrid drive can be coupled and rotationally fixed with directly to the second transmission input shaft of the main transmission. According to the first preferred alternative a preliminary transmission ratio for the electric machine can be provided by the planetary transmission, which is located between the electric machine and the second transmission input shaft of the main transmission.

According to the first, preferred alternative, the planetary transmission connected between the electric machine of the hybrid drive and the second transmission input shaft of the main transmission has the elements of a sun gear, a ring gear and a planetary carrier, wherein a first element of this planetary transmission is permanently coupled and rotationally fixed with the second transmission input shaft of the main transmission, wherein a second element of this planetary transmission is permanent coupled and rotationally fixed with the electric machine, and wherein a third element of this planetary transmission is either permanently connected to the housing, or whenever a first shift element interacting with this planetary transmission is engaged, is connected to the housing and whenever a second shift element interacting with this planetary transmission is engaged, is coupled and rotationally fixed with the first transmission input shaft of the main transmission. According to this embodiment of the invention both an EDA operating mode and an ISG operating mode can be used, wherein it is possible to toggle between the EDA operating mode and the ISG operating mode.

According to a further development, a range group with a planetary transmission and three shift elements is arranged downstream from the main transmission, wherein the planetary transmission of the range group has the elements of a sun gear, a ring gear and a planetary carrier, wherein a first element of the planetary transmission of the range group is permanently coupled and rotationally fixed with the output shaft of the main transmission, and wherein a second element of the planetary transmission of the range group is permanently coupled and rotationally fixed with an output shaft of the range group. Whenever a first shift element of the range group is engaged, the loose gear of the fifth gear plane, serving as an output constant, is coupled and rotationally fixed with the output shaft of the range group. Whenever a second shift element of the range group is engaged, a third element of the planetary transmission is connected to the housing. Whenever a third shift element of the range group is engaged, the third element of the planetary transmission is coupled and rotationally fixed with the output shaft of the range group. By using the range group downstream of the main transmission, the number of gears provided can be doubled. In particular this is of advantage whenever the transmission is supposed to be used in trucks.

BRIEF DESCRIPTION OF THE DRAWINGS

Preferred further developments arise from the subsidiary claims and the subsequent description. Exemplary embodiments of the invention, without being restricted to this, will be explained in detail on the basis of the drawings. The figures show the following:

FIG. 7 a first shifting matrix of the transmission of FIG. 5;

FIG. 8 a second shifting matrix of the transmission of FIG. 5; and

DETAILED DESCRIPTION OF THE PREFERRED EMBODIMENTS

The invention relates to a transmission for a hybrid vehicle, a drive train of a hybrid vehicle with such a transmission and a method for operating such a drive train.

Figures 1, 2:
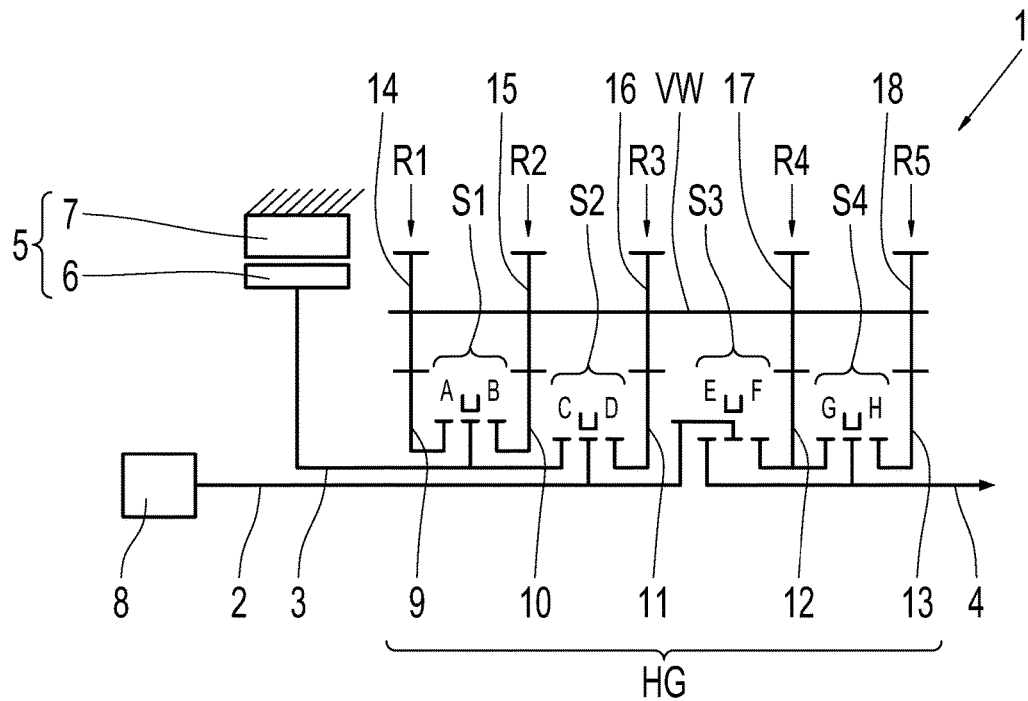
FIG. 1 a diagram of a first transmission according to the invention.
FIG. 2 a shifting matrix of the transmission of FIG. 2.

FIG. 1 shows an exemplary embodiment of a transmission according to the invention 1 for a hybrid vehicle, wherein the transmission 1 comprises at least one main transmission HG with two transmission input shafts 2 and 3 and one output shaft 4. FIG. 1 further shows a hybrid drive of the hybrid vehicle with an electric machine 5 and an internal combustion engine 8, wherein, in FIG. 1, a rotor 6 of the electric machine 5 directly engages with a second transmission input shaft 3 and the internal combustion engine 8 directly engages with a first transmission input shaft 2 of the main transmission HG. A stator 7 of the electric machine 5 is connected to the housing. The main transmission HG thus comprises two partial transmissions connected in parallel with the two transmission input shafts 2 and 3 and the output shaft 4, wherein the first transmission input shaft 2, in the shown exemplary embodiment, is designed as a solid shaft and the second transmission input shaft 3 is designed as a hollow shaft.

The main transmission HG has a first gear plane R1, a second gear plane R2, a third gear plane R3, a fourth gear plane R4 and a fifth gear plane R5, wherein each of these gear planes R1, R2, R3, R4 and R5 comprises a fixed gear 14, 15, 16, 17 or 18 fastened on a countershaft VW and a loose gear 9, 10, 11, 12 or 13 meshing with the respective fixed gear.

Depending on the respective gear plane R1 to R5, the loose gears are either mounted on the first transmission input shaft 2 or on the second transmission input shaft 3 or on the transmission output shaft 4 of the main transmission HG.

The first gear plane R1 comprises a loose gear 9, which is pivoted on the second transmission input shaft 3, wherein the fixed gear of the countershaft VW meshes with this loose gear 9. The second gear plane R2 likewise comprises a loose gear 10 mounted on the second transmission input shaft 3, which meshes with the fixed gear 15 of the countershaft VW. The third gear plane R1 has a loose gear 11 mounted on the first transmission input shaft 2, which meshes with the fixed gear 16 of the countershaft VW. The fourth gear plane R4 and the fifth gear plane R5 each comprise a loose gear 12 or 13 mounted on the output shaft 4 of the main transmission HG, wherein each of these loose gears 12 or 13 of the fourth gear plane R4 of the fifth gear plane R5 meshes with a fixed gear 17 or 18 of the countershaft VW.

The main transmission HG further comprises several form-locking shift elements, namely, a first form-locking shift element A, a second form-locking shift element B, a third form-locking shift element C, a fourth form-locking shift element D, a fifth form-locking shift element E, a sixth form-locking shift element F, a seventh form-locking shift element G and an eighth form-locking shift element H. Whenever the first form-locking shift element A of the main transmission HG is engaged, the loose gear 9 of the first gear plane R1 is coupled and rotationally fixed with the second transmission input shaft 3. Whenever the second form-locking shift element B of the main transmission HG is engaged, the loose gear 10 of the second gear plane R2 is coupled and rotationally fixed with the second transmission input shaft 3 of the main transmission HG. Whenever the third form-locking shift element C of the main transmission HG is engaged, the first transmission input shaft 2 and the second transmission input shaft 3 are coupled and rotationally fixed with each other. Whenever the fourth form-locking shift element D of the main transmission HG is engaged, the loose gear 11 of the third gear plane R3 is coupled and rotationally fixed with the first transmission input shaft 2.

Whenever the fifth shift element E of the main transmission HG is engaged, the first transmission input shaft 2 is directly coupled to the output shaft 4 of the main transmission HG.

The fifth gear plane R5 provides an output constant for the main transmission HG. The output constant, which is provided by the fifth gear plane R5, is not permanently connected to the output shaft 4 of the main transmission HG, but rather shiftably connected.

Thus, whenever the eighth shift element H of the main transmission HG is engaged, the loose gear 13 of the fifth gear plane R5 serving as an output constant is coupled and rotationally fixed with the output shaft 4 of the main transmission HG. On the other hand, whenever this eighth form-locking shift element H of the main transmission HG is disengaged, the loose gear 13 of the fifth gear plane R5 is not coupled directly to the output shaft 4 of the main transmission HG.

Whenever the seventh form-locking shift element G of the main transmission HG is engaged, the loose gear 12 of the gear plane R4, which is adjacent to the fifth gear plane R5 serving as an output constant, is coupled and rotationally fixed with the output shaft 4 of the main transmission HG, while whenever the sixth shift element F of the main transmission HG is engaged, the loose gear 12 of this fourth gear plane R4, which is adjacent to the fifth gear plane R5 serving as an output constant, is coupled and rotationally fixed with the first transmission input shaft 2 of the main transmission HG.

The output constant, thus the fifth gear plane R5, of the main transmission HG is thus, whenever the eighth form-locking shift element H of the main transmission HG is engaged, directly connected and rotationally fixed with the output shaft 4 of the main transmission HG. The loose gear of the fourth gear plane R4 adjacent to the output constant is dependent on the shift position of the seventh form-locking shift element G and of the sixth form-locking shift element F either directly coupled to the output shaft 4 of the main transmission HG or to the first transmission input shaft 2 of the main transmission HG.

As a result, the fourth gear plane R4, adjacent to the output constant, has a double functionality. A first use of this fourth gear plane R4 provides that the same is used as a regular gear ratio, namely, for a flow of power emanating from the first transmission input shaft 2 via the engaged shift element 4, the fourth gear plane R4 and the output constant of the gear plane R5 and the engaged eighth form-locking shift element H to the output shaft 4. In a second use of the fourth gear plane R4, provision is made that the same provides a further output constant, namely, whenever the seventh form-locking shift element G of the main transmission HG is engaged in place of the eighth form-locking shift element H of the main transmission HG. If, for example, the fourth form-locking shift element D and the seventh form-locking shift element G are engaged, the third gear plane R3 serves as a drive input plane and the fourth gear plane R4 as a drive output plane, so that one overdrive gear can then be provided.

A plurality of speeds can be provided with the invention, namely, with the main transmission HG of FIG. 1 from the perspective of the internal combustion engine 8 seven speeds, namely, among others, a direct gear with a transmission ratio i of 1.00 and two overdrive gears with a transmission ratio i less than 1.00. The overdrive gears can be powershifted, as is the case with all the other gears of the transmission 1. The seventh form-locking shift element G, required for the overdrive gears, can be synchronized via the electric machine 5.

All of the shift elements A, B, C, D, E, F, G, H are configured as form-locking, unsynchronized shift elements. In so doing, preferably, the first shift element A and the second shift element B of the main transmission HG are combined into a first double shift element S1, the third form-locking shift element C and the fourth form-looking shift element D into a second double shift element S2, the fifth form-locking shift element E and the sixth shift element F into a third double shift element S3 and the seventh form-locking shift element G and the eighth form-locking shift element H into a fourth double shift element S4.

In the region of each of the double shift elements S1, S2, S3 and S4 only one single shift element A or B, C or D, E or F, G or H is always engaged. However, for each double shift element S1, S2, S3 and S4 both shift elements A and B, C and D, E and F, G and H can also be disengaged or shifted to neutral.

In FIG. 1, only an upper half of the gear set symmetrical to the axis of shafts 2, 3 and 4 is shown. By mirroring on these axes, a variant with two countershafts can be provided, which can be used for power distribution. However, a single countershaft can also be used.

FIG. 2 shows a shifting matrix for the main transmission HG of FIG. 1, wherein in the first column of FIG. 2 gears 1 to 7 are shown from the perspective of the internal combustion engine 8, namely, such that the shift elements A, B, C, D, E, F, G and H of the double shift elements S1, S2, S3 and S4 engaged in the respective gear are marked X.

In addition, the shifting matrix of FIG. 2 shows transmission ratios i and gear speed increments phi for these gears, namely, under the assumption that for gear planes R1, R2, R3, R4 and R5 the following transmission ratios apply, namely for gear plane R1 a transmission ratio i1=−1.300, for gear plane R2 a transmission ratio i2=−0.592, for gear plane R3 a transmission ratio i3=−0.770, for gear plane R4 a transmission ratio i4=−1.000 and for gear plane R5 a transmission ratio i5=−2.197.

The transmission ratios specified above correspond to the respective teeth/tooth ratio of the meshing spur gears. The negative sign refers to a reversal of the direction of rotation. The transmission ratios of the meshing spur gear pairs of the gear planes R1 to R5 are specified subsequently direction of flow of power: For gear planes R1, R2, R3 and R4 from the transmission input shafts 2, 3 to the countershaft VW and for the fifth gear plane R5 from the countershaft VW to the output shaft 4 of the main transmission HG.

Whenever the flow of power of the internal combustion engine 8 is guided over the first transmission input shaft 2, then a gear can be pre-selected in the other partial transmission, which interacts with the second transmission input shaft 3, alternatively both partial transmissions can be coupled. For gear selection in the respective gear from the perspective of the internal combustion engine 8 the pre-selectable gear is specified in column 1 in parentheses. The gear 2(1) means that the second gear is active for the internal combustion engine 8, wherein the first gear is pre-selected for the internal combustion engine 8 and is simultaneously active for the electric machine 5. The gear 5(7) means that the fifth gear is active for the internal combustion engine 8 and the seventh gear is pre-selected for the internal combustion engine 8, wherein the seventh gear is currently active for the electric machine 5.

Whenever the gear remains the same from the perspective of the internal combustion engine 8, it is a matter of a load-free pre-selection shifting in the background, which can be synchronized by means of the electric machine 5, for example, shifting from gear 2(1) to gear 2(4) or from gear 5(4) to gear 5(7).

If the gear changes from the perspective of the internal combustion engine 8, it is a matter of an electrically assisted shifting, for example from gear 2(4) to gear 3(4) or from gear 4 to gear 5(4).

According to the shifting matrix of FIG. 2, from the perspective of the internal combustion engine 8, the main transmission HG of FIG. 1 provides seven gears. The sixth gear and for the seventh gear, from the perspective of the internal combustion engine 8, are coupling gears, namely, first and second overdrive gears.

The sixth gear results from the fact that with the second form-locking shift element B is engaged, the fourth form-locking shift element D and the seventh form-locking shift element G are also engaged, while the second overdrive gear 7 results from the fact that when the shift element B is engaged, the third form-locking shift element C and the seventh form-locking shift element G are also engaged.

The internal combustion engine 8 interacts with the first transmission input shaft 2, which is, preferably, designed as a solid shaft, and with a corresponding partial transmission of the main transmission HG, to which the gears 2, 3, 5 and 6 are assigned. Gear 5 is a direct gear with a transmission ratio i=1.00, at which the flow of power is not beyond the countershaft VW. The electric machine 3 interacts beyond the second transmission input shaft 3, which is preferably designed as a hollow shaft, with another partial transmission of the main transmission HG, to which gears 1, 4 and 7 are assigned.

When shift element C is engaged, the two partial transmissions or the two transmission input shafts 2 and 3 are coupled. Then the internal combustion engine 8 can share the gears of the partial transmission, which is assigned to the electric machine 5. Likewise, in this case the electric machine 5 can share the gears of the partial transmission, which is assigned to the internal combustion engine 8. However, because the second double shift element S2 comprises the third form-locking shift element C with the fourth form-locking shift element D, the electric machine 5 cannot use the gear connected to the fourth form-locking shift element D.

Further whenever the third form-locking shift element C of the main transmission HG is engaged, the internal combustion engine 8 can be connected to the electric machine 5, without a gear being connected to the output shaft 4 of the main transmission HG. As a result, it is then possible to start the internal combustion engine 8 via the electric machine 5, or it is possible, regardless of the driving speed, even during standstill, to generate the power in neutral where the internal combustion engine 8 then drives the generator driven electric machine 5.

It is possible to drive in a charge depletion mode using three gears, namely, the gears of the partial transmission, which interacts with the second transmission input shaft 3, wherein when the electric machine rotates in reverse, the motor vehicle can be driven in reverse.

As FIG. 1 shows, a separating clutch or starting clutch between the internal combustion engine 8 and the first transmission input shaft 2 can be omitted. This is possible because the first transmission input shaft 2 can be uncoupled when shift elements C, D, E and F are disengaged. However, it is also possible to provide, as an option, a separating clutch between the internal combustion engine 8 and first transmission input shaft 2.

Because of the two partial transmissions of the main transmission HG, the internal combustion engine 8 and electric machine 5 can be operated at different transmission ratios. This is advantageous, because this way suitable operating points can be selected for the internal combustion engine 8 and the electric machine 5, depending on the driving situation. The electric machine 5 can also be completely or partially uncoupled, wherein when the electric machine 5 is at a standstill zero load losses can be avoided.

In hybrid operation powershifting is possible. Thus during a gear change of a gear which is assigned to the partial transmission which interacts with the first transmission input shaft 2, traction force is supported via the second transmission input shaft 3 and the electric machine 5. Whenever a gear change of a gear is supposed to occur which is assigned to the partial transmission, which interacts with the second transmission input shaft 3, the traction force can be supported via the internal combustion engine 8 and the first transmission input shaft 2.

Shift elements A, D, G and H can always be actively synchronized via the electric machine 5. The same can thus be designed as unsynchronized claw shift elements. Shift elements C, D, E and F can be synchronized in different ways.

The shift elements C, D, E and F can be actively synchronized via the internal combustion engine 8 when the internal combustion engine 8 is firmly connected to the first transmission input shaft 2.

Whenever the internal combustion engine 8 is connected to the interconnection of a starting clutch or a separating clutch with the first transmission input shaft 2, these shift elements C, D, E and F can be actively synchronized when the separating or starting clutch is engaged via the internal combustion engine 8, alternatively via another central synchronization. In these two cases, shift elements C, D, E and F can each also be designed as unsynchronized claw shift elements.

Further it is possible to design shift elements C, D, E and F as synchronized shift elements, namely, whenever the internal combustion engine 8 is coupled to the first transmission input shaft 2 via a separating or a starting clutch, not shown in the figure.

In the exemplary embodiment shown in FIG. 1, the rotor 6 of the electric machine 5 is permanently coupled and rotationally fixed with the second transmission input shaft 3, wherein the internal combustion engine 8 is permanently coupled and rotationally fixed with the first transmission input shaft 2. As already stated, a separating or a starting clutch can also be connected between the first transmission input shaft 2 and the internal combustion engine 8.

Figure 3:
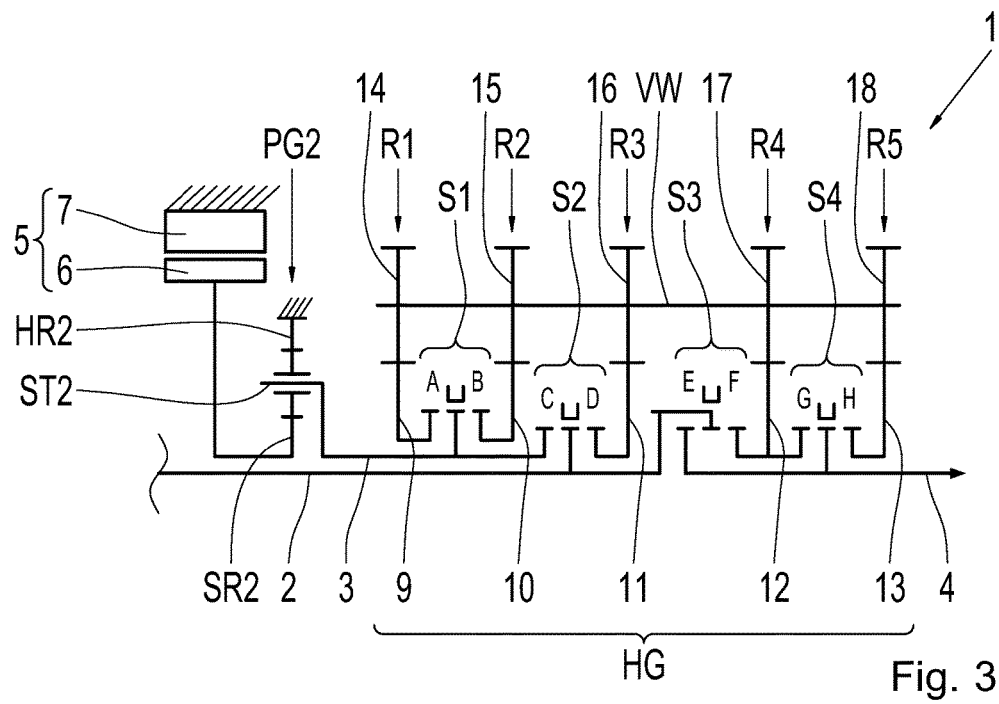
FIG. 3 a diagram of a second transmission according to the invention.

FIG. 3 shows a further development of the transmission 1 of FIG. 1, wherein in the exemplary embodiment of FIG. 3, a planetary transmission PG2 is connected between the electric machine 5 and the second transmission input shaft 2 which has the elements of a sun gear SR2, a planetary carrier ST2 and a ring gear HR2.

Figure 6:
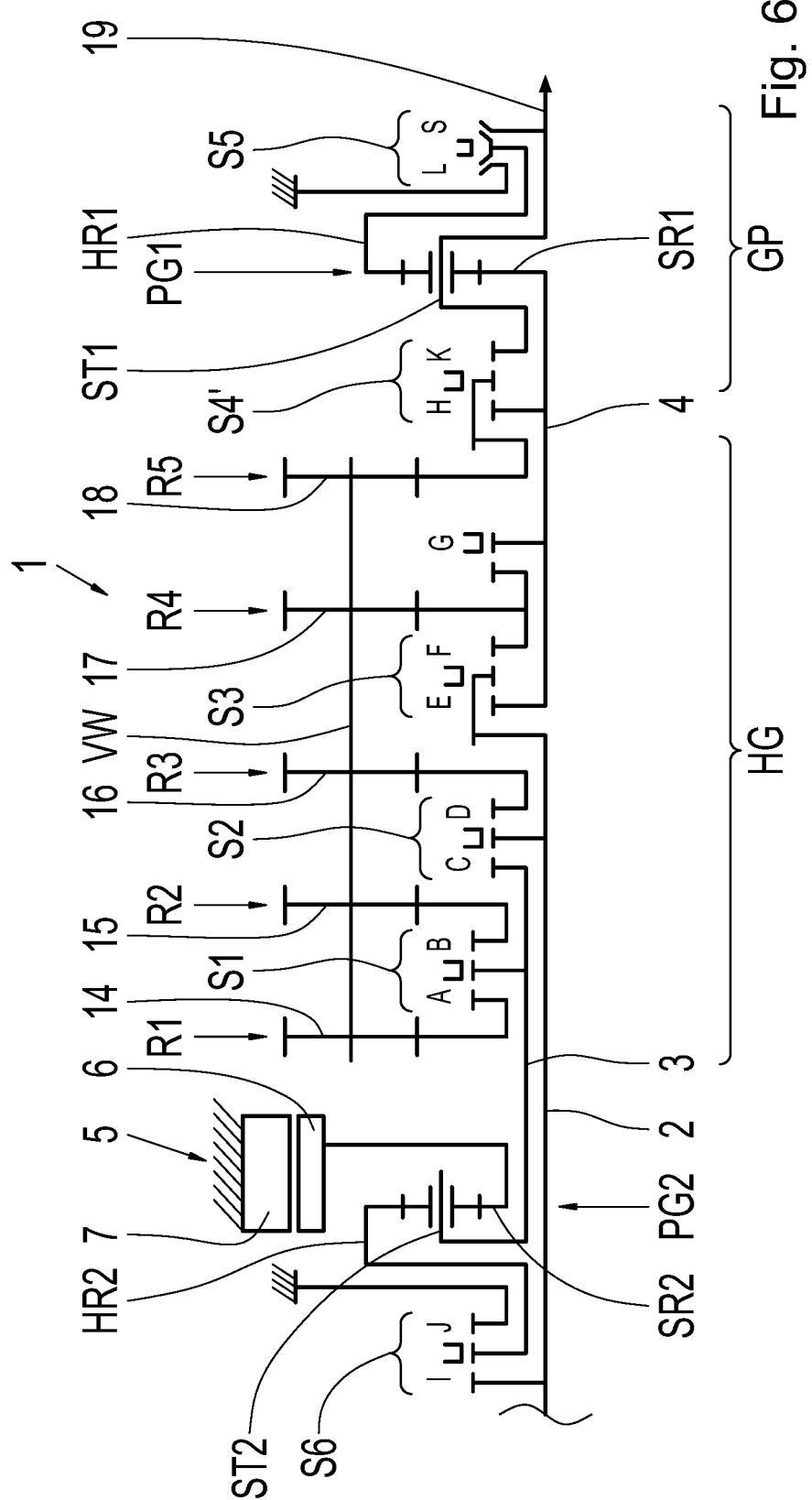
FIG. 6 a diagram of a fifth transmission according to the invention.

To this end, in the variant of FIG. 6, a first element ST2 of the planetary transmission PG2 is permanently coupled and rotationally fixed with the second transmission input shaft 3 of the main transmission HG, wherein the rotor 6 of the electric machine 5 is permanently coupled and rotationally fixed with a second element SR2 of this planetary transmission PG2. The first element of the planetary transmission PG2 is, preferably, the planetary carrier ST2 and the second element of the planetary transmission PG2 is the sun gear SR2.

In FIG. 3 a third element of the planetary transmission PG2, namely preferably the ring gear HR2 of the planetary transmission PG2, is permanently connected to the housing. In this case, the planetary transmission PG 2 provides a fixed transmission ratio for the electric machine 5. This has the advantage that the electric machine 5 can be designed with less torque and in exchange for higher speed, since the planetary transmission PG2 functions as a preliminary transmission ratio for the electric machine 5.

Figure 4:
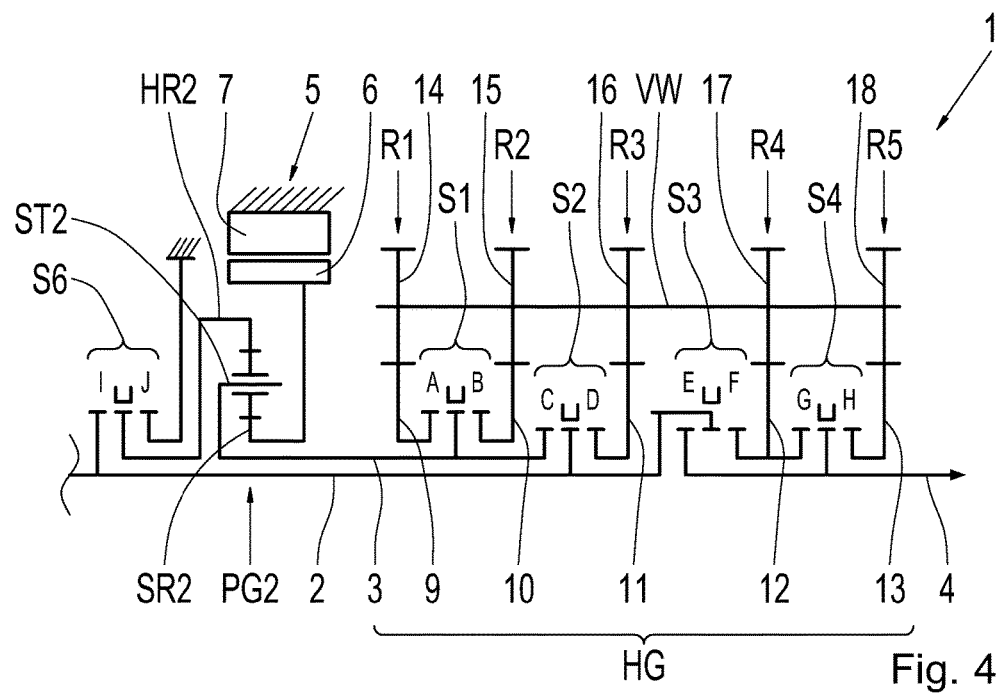
FIG. 4 a diagram of a third transmission according to the invention.

On the other hand, FIG. 4 shows a further embodiment of the transmission 1 of FIG. 1, in which the third element of the planetary transmission PG2, namely, the ring gear HR2, is either connected to the housing or connected and rotationally fixed with the first transmission input shaft 2 of the main transmission HG, depending on the shift position of two further form-locking shift elements. Thus, in FIG. 4, a first shift element J interacts with the planetary transmission PG2 which, in the engaged state, connects the ring gear HR2 of the planetary transmission PG2 to the housing. Further, a second form-locking shift element I interacts with the planetary transmission PG2, which, whenever the same is engaged, the ring gear HR2 of the planetary transmission PG2 is coupled and rotationally fixed with the first transmission input shaft 2 of the main transmission HG. In so doing, according to FIG. 4, these two form-locking shift elements I and J, which cooperate with the planetary transmission PG2 interacting between the electric machine 5 and the second transmission input shaft 3 of the main transmission HG, provided by the double shift element S6, wherein only one of the shift elements J and I can always be engaged.

Whenever the shift element J is engaged, thus when the ring gear HR 2 of the planetary transmission PG2 is connected to the housing, the planetary transmission PG2, in turn, acts as a fixed preliminary transmission ratio for the electric machine 5, wherein then a so-called ISG operating mode, in particular, can be provided. However, whenever the form-locking shift element I is engaged, thus when the ring gear HR2 of the planetary transmission PG2 is not connected to the housing, but rather is coupled and rotationally fixed with the first transmission input shaft 2 of the main transmission HG, the planetary transmission PG2 acts as a superposition transmission for internal combustion engine 8 and electric machine 5, so that then a so-called EDA operating mode and a so-called EDS operating mode can be used.

Whenever the shift element J is engaged, preferably a so-called ISG operating mode can be used, wherein then, as already stated, the planetary transmission PG2 acts as a fixed preliminary transmission ratio for the electric machine 5. ISG operating mode has the advantage that the electric machine 5 can then be designed with less torque and higher speed.

Whenever the shift element is engaged, the so-called EDA operating mode is provided, in which the planetary transmission PG2 acts as a superposition transmission. In EDA operating mode, electrodynamic starting is possible when the form-locking shift element is engaged. In this case, the first gear is engaged, that means that the form-locking shift elements A and H are engaged, however the shift element C is not engaged. When the vehicle is stationary the planetary carrier ST2 of the planetary transmission PG2 stands still. The internal combustion engine 8 operates at idling speed, the electric machine 5 reverses. The torque ratios on the planetary transmission PG2 are constant. The torques of the internal combustion engine 8 and electric machine 5 add up on the planetary carrier ST2 of the planetary transmission PG2. In this way, electrodynamic starting is possible in EDA operating mode. During the start-up procedure the speed of the electric machine 5 changes, until the planetary transmission PG2 is in direct drive. Then the starting in EDA operating mode can be terminated, by engaging the form-locking shift element C and blocking the planetary transmission PG2.

When the shift element I is engaged, in the so-called EDA operating mode, electrodynamic shifting is also possible, namely, under the provision of a so-called EDS power shifting function. To this end, a gear is engaged in the partial transmission, which interacts with the second transmission input shaft. This gear serves as a supporting gear, via which load is conducted during the power shifting. This supporting gear can in so doing be identical to the actual gear or to the target gear, but does not have to correspond to either gear.

With EDS power shifting a load transfer occurs first, wherein here torques are set on the internal combustion engine 8 and on the electric machine 5 such that the ratio of the torques corresponds to the stationary transmission ratio of the planetary transmission PG2. In so doing, the flow of power then occurs exclusively via the planetary carrier ST2 of the planetary transmission PG2 and via the supporting gear. All other gear shift elements are load free. The load free gear shift elements of the actual gear can be disengaged. The speeds of the internal combustion engine 8 and the electric machine 5 are regulated such that the gear shift element of the target gear to be engaged becomes synchronous. The synchronous shift element of the target gear is then engaged, the shifting is completed, wherein load on the electric machine 5 can be reduced as required.

Such an EDS power shifting function has the advantage that the shift element to be engaged is synchronized in the interaction of the electric machine 5 and internal combustion engine 8. A further advantage of the EDS power shifting method is that a high traction force can be achieved, since the torques from the internal combustion engine 8 and electric machine 5 of the planetary transmission 2 add up.

Figure 5:
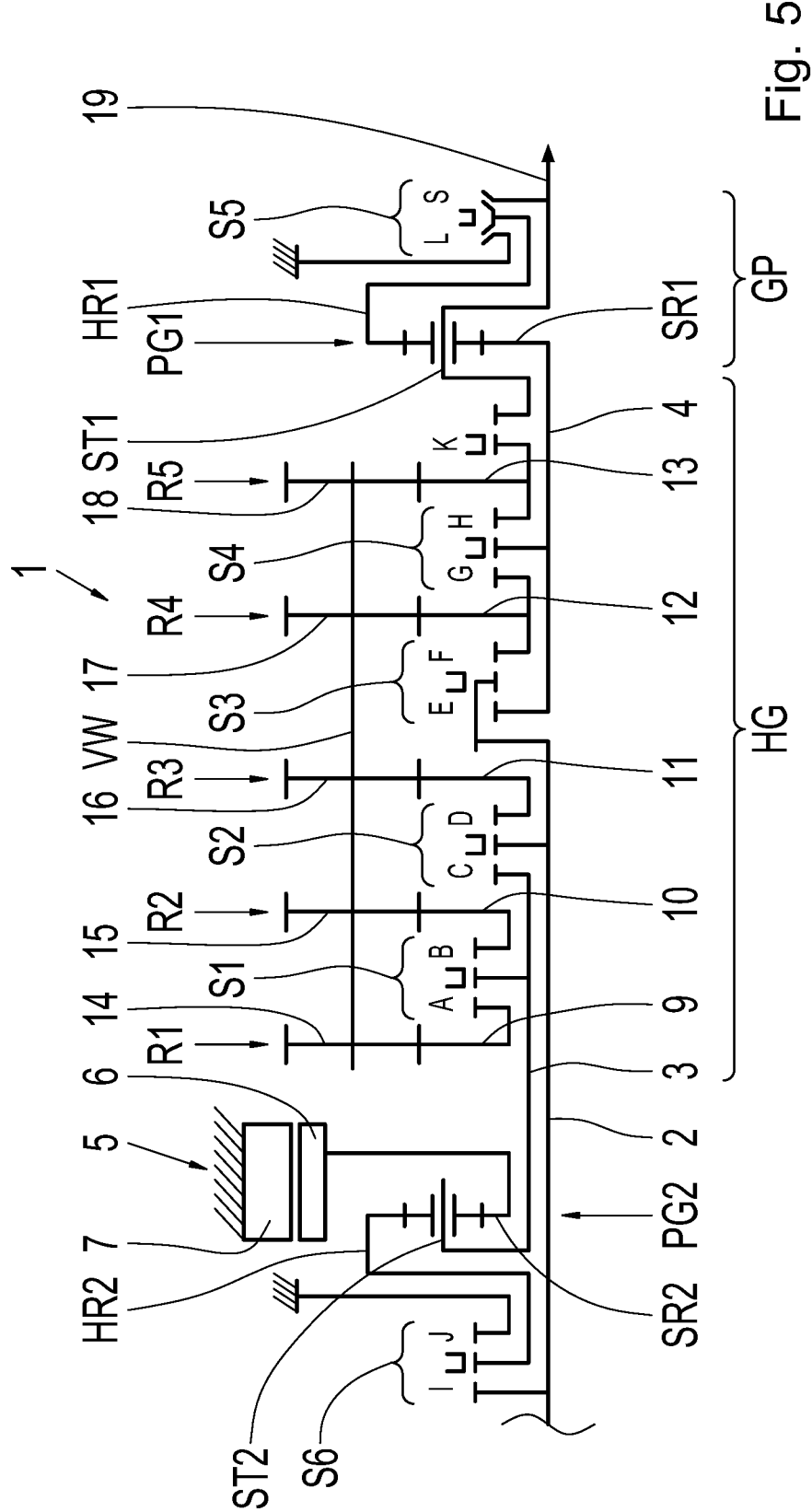
FIG. 5 a diagram of a fourth transmission according to the invention.

FIG. 5 shows another advantageous further development of the transmission 1, wherein the transmission 1 of FIG. 5 is a further embodiment of the transmission 1 of FIG. 4. Thus, the transmission 1 of FIG. 5 has a range group GP with a planetary transmission PG1, in addition to the main transmission HG, and three shift elements K, L and S. The planetary transmission PG1 of the range group GP has the elements of a sun gear SR1, a planetary carrier ST1 and a ring gear HR1.

A first element of the planetary transmission PG1 of the range group GP, according to FIG. 5, the sun gear SR1 of the planetary transmission PG1, is permanently coupled and rotationally fixed with the output shaft 4 of the main transmission HG. A second element of the planetary transmission PG1 of the range group GP, according to FIG. 5, the planetary carrier ST1 of the planetary transmission PG1, is permanently coupled and rotationally fixed with an output shaft 19 of the range group GP.

Whenever a first shift element K of the range group GP is engaged, the loose gear 13 of the fifth gear plane R5 of the main transmission HG acting as the output constant is connected and rotationally fixed with the planetary carrier ST1 of the planetary transmission PG and thus to the output shaft 19 of the range group GP.

Whenever a second shift element L of the range group GP is engaged, a third element of the planetary transmission PG1 of the range group GP, namely, the ring gear HR1 according to FIG. 5, is connected to the housing, while whenever a third shift element S of the range group GP is engaged, the third element of the planetary transmission PG1 of the range group PG, namely, the ring gear HR1, is connected and rotationally fixed with the output shaft 19 of the range group GP. According to FIG. 5, the second shift element L and the third shift element S of the range group GP are formed by a double shift element S5, wherein only one of the shift elements L, S of the double shift element S5 can always be engaged, alternatively both shift elements L and S of the double shift element S5 can be disengaged.

Thus for the transmission of FIG. 5, the loose gear 13 of the fifth gear plane R5, which forms the output constant of the main transmission HG, can be coupled to the output shaft 19 of the range group GP, when shift element K is engaged, and can be coupled to the output shaft 4 of the main transmission HG, when shift element H is engaged. The loose gear 12 of the fourth gear plane R4, which is adjacent to the fifth gear plane R5, which provides the output constant of the main transmission HG, is coupled to the output shaft 4 of the main transmission HG, when shift element G is engaged, and is coupled to the first transmission input shaft 2 of the main transmission HG, when shift element F is engaged.

The range group GP, rear mounted on the main transmission HG, is used to double the number of gears of the main transmission HG. Whenever the shift element L of the range transmission group GP is engaged, a slow travel range is shifted, while whenever the shift element S of the range group GP is engaged, a fast travel range is shifted via the range group GP.

Such a range group GP is advantageous whenever the main transmission HG is supposed to be used with trucks.

The output constant provided by the fifth gear plane R5 can be reconnected. Thus the loose gear 13 of the output constant, and thus of the fifth gear plane R5, can be coupled to the sun gear SR1 of the planetary transmission PG1 of the range group GP and thus to the output shaft 4 of the main transmission HG, when shift element H is engaged, and can be coupled to the planetary carrier ST1 of the planetary transmission PG1 and thus to the output shaft 19 of the range group GP, when shift element K is engaged. In the coupling of the output constant to the planetary carrier ST1, when shift element K is engaged via the countershaft the electric machine 5, can support the traction force via the shift element K directly on the planetary carrier ST1 of the planetary transmission PG1 of the range group GP, while the double shift element S5 can be toggled, without load, between the shift element settings L and S. Further the speed of the countershaft VW can be reduced while driving in direct gear, in order to reduce drag losses on bearings and seals.

One special feature of the transmission 1 of FIG. 5 lies in the fact that the two overdrive gears cannot be used whenever the shift element L of the double shift element S5 of the range group GP is engaged, since otherwise the range group GP could not be powershifted under load. Shifting of the range group GP can only be performed under load from the direct gear. In direct gear, the countershaft VW is load free so that then the next higher gear can be pre-selected load free. By coupling the operating constants of the fifth gear plane R5 to the planetary carrier ST1 of the planetary transmission PG1 of the range group PG, when shift element K is engaged in the subsequent gear, the shift element L of the range group GP becomes load free. After that it is possible to shift bad free from shift element L to shift element S.

FIGS. 7 and 8 show shifting matrices for the transmission 1 of FIG. 5, again together with transmission ratios i and gear speed increments phi, namely, under the assumption that the planetary transmission PG2 has a stationary transmission ratio i0 of −2.00, and that the planetary transmission PG1 of the range group GP has a stationary transmission ratio i0=−2.720.

The above valid transmission ratios for the shifting matrix of FIG. 2 apply for transmission ratios i1, i2, i3, i4 and i5 of the gear planes R1, R2, R3, R4 and R5. From the perspective of the internal combustion engine 8, the shifting matrix of FIG. 7 specifies gears in the so-called ISG operating mode, thus in so doing with shift element J engaged. Gears placed in parentheses are, in turn, pre-selected gears, which are pre-selected for the internal combustion engine 8 and are already active for the electric machine 5. Whenever the flow of power of the internal combustion engine 8 in the ISG operating mode is conducted, via the first transmission input shaft 2, a gear can, in turn, be pre-selected in the flow of power-free partial transmission interacting with the second transmission input shaft 3. Further, the two partial transmissions can be coupled to each other. As already described in connection with the shifting matrix of FIG. 2, pre-selected gears are also specified in parentheses in the shifting matrix of FIG. 7.

Whenever the gear, from the perspective of the internal combustion engine, remains the same, but the set gear in parentheses changes, it is a matter of a bad-free pre-selection shifting in the background, which can be synchronized by means of the electric machine 5, so when shifting from gear 2(1) to gear 2(4) for example. Whenever the gear changes from the perspective of the internal combustion engine, it is a matter of an electrically assisted power shifting, for example when shifting from gear 1 to gear 2(1).

During load free pre-selection shifting from gear 10(9) to gear 10(12), thus in the retention of gear 10 for the internal combustion engine while changing the active gear for the electric machine from gear 9 to gear 12, the shift element G is synchronized by means of the electric machine 5. In the reverse direction, when shifting from gear 10(12) to gear 10(9), the shift element K is synchronized by means of the electric machine. Shifts from gear 10(12) to gear 11(12) and from gear 11(12) to gear 12 occur with electrical traction force support, supporting moment is then accordingly conducted via the twelfth gear. In reverse direction this also occurs for downshifting.

FIG. 8 shows a shifting matrix for the transmission 1 of FIG. 5 in the FDA operating mode, thus whenever the shift element I is engaged in place of the shift element J. The shifting matrix of FIG. 8 is identical to the shifting matrix of FIG. 7; however, there are different gear ratios on the electric machine 5 and on the planetary transmission PG2. In the case of a load free pre-selection shifting, from gear 10(9) to gear 10(12), the shift element G is synchronized by means of the electric machine 5 via the planetary transmission PG. In the reverse direction in the case of a pre-selection shifting from gear 10(12) to gear 10(9), the shift element K is synchronized by means of the electric machine 5 via the planetary transmission PG2. Shifts 10(12) to 11(12) and shift 11(12) to 12 occur with electrical traction force support via planetary gear set PG2, wherein the supporting moment on the planetary carrier ST2 of the planetary transmission PG2 is conducted via the twelfth gear, FIG. 6 shows a further transmission 1, wherein the transmission 1 of FIG. 6 differs from the transmission 1 of FIG. 5 in the arrangement and grouping of form-locking shift elements G, H and K. Thus, in the transmission 1 of FIG. 5, the shift element K is designed as a single shift element, while shift elements G and H are formed by a double shift element S4. In contrast to this, in FIG. 6 shift element G is designed as a single shift element, in this case shift elements H and K are then provided by a double shift element S4', The shifting matrices of FIGS. 7 and 8 apply analogously for the transmission 1 of FIG. 6.

Further it should be noted that shift elements G, H and K can also be combined into a triple shift element and can be actuated by means of a joint actuator. In that way only one of the three shift elements G, H and K is always engaged.

In addition, the invention relates to a drive train of a hybrid vehicle with an above described transmission 1, wherein the internal combustion engine 8 is preferably permanently coupled and rotationally fixed with the first transmission input shaft 2 of the main transmission HG, and wherein the electric machine 5 is coupled, either directly or with the interconnection of the planetary transmission PG2, to the second transmission input shaft 3 of the main transmission HG.

In addition, the present invention relates to a method for operating a drive train having the main transmission HG and the range group GP, namely, on the one hand, a method for controlling traction force interruptions when changing gears in the ISG operating mode, when shift element J is engaged, and a method for controlling traction force interruptions when changing gears in the EDA operating mode, when shift element I is engaged.

Whenever controlling traction force interruptions is supposed to be provided, when changing gears in the ISG operating mode, the shift element J is thus engaged. Further, it is assumed that driving is occurring in fifth gear in the internal combustion engine or hybrid engine, thus in direct gear, namely, whenever shift element L is engaged on the range group GP. The fourth gear is pre-selected and active for the electric machine 5, shift elements B and H are engaged.

Proceeding from this ISG operating mode, to shift to a higher gear, preferably a load reduction first occurs at the electric machine 5, wherein the internal combustion engine 8 assumes the corresponding load. Then the eighth shift element H of the main transmission HG is disengaged load free. After that an active synchronization of the first shift element K of the range group GP occurs via the electric machine 5, namely, with a speed controlled electric machine 5. To this end, the speed of the electric machine 5 is reduced. The speed reduction occurs by the factor of the transmission ratio of the range group GP. The first shift element K of the range group GP is then engaged bad free, this corresponds to gear 5(9). Subsequently the second shift element B of the main transmission HG is disengaged bad free. Then the first shift element A of the main transmission HG is actively synchronized, namely, via a speed controlled operation of the electric machine 5. To this end, the speed of the electric machine 5 is increased, namely, to the speed level of the sixth gear. Then shift element A is engaged bad free. In the shifting matrix this corresponds to gear 5(6), accordingly then the correct subsequent gear, thus the sixth gear, is pre-selected, thus active for the electric machine 5.

Then a load transition from the internal combustion engine 8 to the electric machine 5 occurs, that means the electric machine 5 supports the traction force in the target gear. After the internal combustion engine 8 has become load free, the fifth shift element E of the main transmission HG is disengaged. The internal combustion engine 8 synchronizes the third shift element C of the main transmission HG to target speed. Then the third shift element C of the main transmission HG can be engaged load free, the sixth gear is then engaged for the internal combustion engine 8. Shifting is completed. This corresponds to gear 6(L). Depending on the operation strategy, a load transition from the electric machine 5 to the internal combustion engine 8 can be performed.

Optionally provision can be made that as soon as the fifth shift element E of the main transmission HG is disengaged, the range group GP is shifted to the fast travel range S. This occurs by changing the synchronized shift elements L and S in the background, namely, load free.

To summarize, it can be stated that then, to change from fifth gear to sixth gear, it is necessary to shift from shift element H to shift element K and between shift elements A and B. First there is a change from shift element H to shift element K and then between shift elements A and B. The advantage is that first the electric machine 5 reduces its speed and can be synchronized with higher torque. Less energy is required to change the inertial mass of the rotor 6 of the electric machine 5. If shifting took place first between shift elements A and B, the speed of the electric machine 5 would sharply increase in the interim, which would be disadvantageous as there would be a risk of overspeed. The method described above is independent from the preliminary transmission ratio of the planetary transmission PG1 for the electric machine 5. The method can also be implemented, when there is no planetary transmission PG2, thus when the rotor of the electric machine 5 is directly coupled to the second transmission input shaft 3.

Below the inventive method for controlling traction force interruptions when changing gears in the EDA operating mode will be described, wherein the shift element I is engaged in the EDA operating mode. Further it should be assumed that in fifth gear, thus in direct gear, the vehicle is powered by the internal combustion engine or hybrid engine, thus with shift elements E and L engaged. Thus, it should be assumed that gear 5(4) is active, thus for the internal combustion engine gear 5 is active and for the electric machine gear 4 is active. To this end shift elements B and H are engaged.

To carry out the gear change first the load on the electric machine 5 is reduced, and, where available, assumed by the internal combustion engine 8. Subsequently the eighth shift element H of the main transmission HG will be disengaged load free. Then, an active synchronization of the first shift element K of the range group GP with the electric machine 5 occurs, namely, by controlling the speed of the electric machine 5. To this end, the speed of the planetary carrier ST2 of the planetary transmission PG2 is reduced. This happens by reducing the speed of the electric machine 5. The speed reduction on the planetary carrier ST2 of the planetary transmission PG2 occurs by the factor of the transmission ratio of the range group GP. Subsequently, the first shift element K of the range group GP can be engaged load free. Then gear 5(9) is active, gear 5 for the internal combustion engine, while gear 9 is active for the electric machine, and thus is pre-selected for the internal combustion engine, since shift element B is still engaged.

This is followed by a load free disengagement of the second shift element B of the main transmission HG. Then the first shift element A of the main transmission HG is actively synchronized, namely, via an electric machine 5 operated with speed control. To this end, the speed on the planetary carrier of the planetary transmission PG2 is increased, namely, to the speed level of the sixth gear. This occurs, in turn, by increasing the speed of the electric machine 5. Subsequently the first shift element A of the main transmission HG can be engaged load free. In this case, gear 5(6) is then engaged, thus gear 5 is active for the internal combustion engine, while gear 6 is active for the electric machine 5.

Then the torques from internal combustion engine 8 and electric machine 5 will be set such that they are in proportion to the stationary transmission ratio of the planetary transmission PG2. As a result, the fifth shift element E to be disengaged of the main transmission HG becomes load free. The flow of power then runs exclusively via the planetary carrier ST2 from the planetary transmission PG2 via the target gear, thus via shift elements A and K. Simultaneously, the torques from the internal combustion engine 8 and electric machine 5 are set within the scope of their limits such that the traction force corresponds, as closely as possible, to the target torque desired by the driver or a driving strategy. Once the fifth shift element E of the main transmission HG has become load free, the same is disengaged load free. Subsequently, the torques from the internal combustion engine 8 and electric machine 5 are regulated such that the internal combustion engine speed drops to the target speed, that means the shift element C is synchronized. Subsequently, the third shift element C of the main transmission HG can be engaged load free, wherein then the sixth gear is engaged for the internal combustion engine. The shifting is completed, thus gear 6 (L) is engaged.

Depending on the operating strategy, load can be transferred from the electric machine 5 to the internal combustion engine 8. As soon as the shift element E is disengaged, the range group GP can optionally be changed by disengaging the shift element L and engaging the shift element S.

To change from gear 5 to gear 6 for the internal combustion engine, it is necessary to shift both from the eighth shift element H of the main transmission HG to the first shift element K of the range group GP and between shift elements A and B. First shifting takes place from shift element H to shift element K and only subsequently the shifting between shift elements A and B. This, in turn, has the advantage that the electric machine 5 first has its speed reduced and thus can be synchronized with higher torque. Less energy is required to change the speed of the inertial mass of the rotor of the electric machine 5, than would be the case if shifting took place between shift elements A and B first.

As stated above, a separating clutch between internal combustion engine 8 and first transmission input shaft 2 can be omitted. However such a separating clutch can also be optionally used between the internal combustion engine 8 and first transmission input shaft 2.

Further, at least one mechanical reverse gear can be optionally provided, either via an additional spur gear plane in the main transmission HG with an additional shift element, or as a planetary changing set, for example, on the transmission input of the main transmission HG with two additional shift elements, or as a range group GP with integrated reverse gear.

Figure 9:
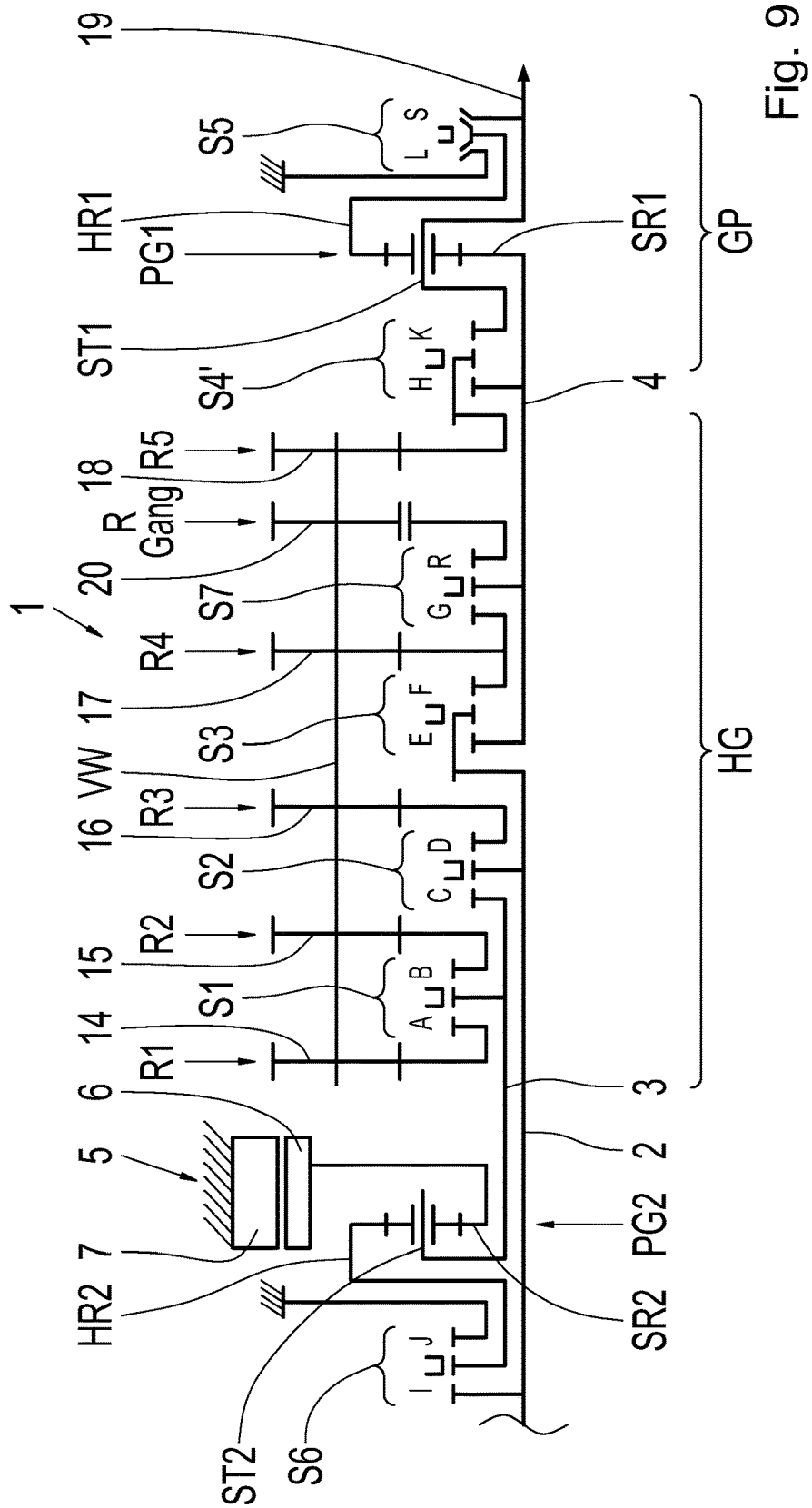
FIG. 9 shows an embodiment based on the transmission according to FIG. 6, however, with a mechanical reverse gear.

FIG. 9 shows an embodiment based on the transmission according to FIG. 6, however, with a mechanical reverse gear. To this end, the transmission shown in FIG. 9 has an additional spur gear plane in the main transmission HG, which as a reverse gear plane is referred to as R-Gear. The other gear planes are to be understood as gear planes for forward gears. In addition, a shift element R for shifting the mechanical reverse gear is provided and assigned to reverse gear plane R-Gear. The reverse gear plane R-Gear has an idler gear, not shown in the figure, for the reversal of the direction of rotation, which is arranged in the flow of power between a fixed gear 20 arranged on the countershaft VW and a loose gear arranged on the output shaft 4. In addition, the transmission 1 of FIG. 9 differs from the transmission 1 of FIG. 6 through the grouping of form-locking shift elements G and R. Hence, for transmission 1 of FIG. 6 the shift element G is configured as a single shift element, while for transmission 1 of FIG. 9, shift elements G and R are combined into a double shift element S7.

If necessary, the gear assignment of the gears can be adapted to gear planes R1 to R5 in the main transmission HG. In addition, different transmission ratios can be used for gear planes R1 to R5 and the planetary transmission PG1, PG2.

REFERENCE NUMERALS

1 Transmission
2 Transmission input shaft
3 Transmission input shaft
4 Output shaft
5 electric machine
6 Rotor
7 Stator
8 Internal combustion engine
9 Loose gear
10 Loose gear
11 Loose gear
12 Loose gear
13 Loose gear
14 Fixed gear
15 Fixed gear
16 Fixed gear 17 Fixed gear
18 Fixed gear
19 Output shaft
A Shift element
B Shift element
C Shift element
D Shift element
E Shift element
F Shift element
G Shift element
H Shift element
I Shift element
J Shift element
K Shift element
L Shift element
S Shift element
HG Main transmission
GP Range group
PG1 Planetary transmission SRI Sun gear
ST1 Planetary carrier
HR1 Ring gear
PG2 Planetary transmission SR2 Sun gear
ST2 Planetary carrier
HR2 Ring gear
R1 Gear plane
R2 Gear plane
R3 Gear plane
R4 Gear plane
R5 Gear plane
S1 Double shift element
S2 Double shift element
S3 Double shift element
S4 Double shift element
S4' Double shift element
S5 Double shift element
S6 Double shift element
VW Countershaft

We claim:

1. A transmission for a hybrid vehicle, wherein the hybrid vehicle has a hybrid drive with an internal combustion engine and an electric machine, the transmission comprising a housing, and the transmission further comprising at least one main transmission with at least the following assemblies:
   two partial transmissions being connected in parallel with two transmission input shafts and one output shaft, the electric machine being connectable to a first transmission input shaft of a first partial transmission of the internal combustion engine and to a second transmission input shaft of a second partial transmission;
   a first gear plane, a second gear plane, a third gear plane, a fourth gear plane and a fifth gear serving as an output constant, each gear plane having a fixed gear fastened on a countershaft and a loose gear meshing with the respective fixed gear, supported on the first transmission input shaft or the second transmission input shaft or the output shaft;
   a first shift element, a second shift element, a third shift element, a fourth shift element, a fifth shift element, a sixth shift element, a seventh shift element and an eighth shift element,
   wherein whenever the eighth shift element of the main transmission is engaged, the loose gear of the fifth gear plane, which serves as the output constant, is rotationally engaged with the output shaft of the main transmission,
   whenever the seventh shift element of the main transmission is engaged, the loose gear of the fourth gear plane, which is adjacent to the fifth gear plane which serves as the output constant, is rotationally engaged with to the output shaft of the main transmission, and
   whenever the sixth shift element of the main transmission is engaged, the loose gear of the fourth gear plane, which is adjacent to the fifth gear plane which serves as the output constant, is rotationally engaged with the first transmission input shaft.

2. The transmission according to claim 1, wherein whenever the fifth shift element is engage, the first transmission input shaft is directly rotationally engaged with the output shaft of the main transmission.

3. The transmission according to claim 1, wherein
   whenever the first shift element of the main transmission is engaged, the loose gear of the first gear plane is rotationally engaged with the second transmission input shaft,
   whenever the second shift element of the main transmission is engaged, the loose gear of the second gear plane is rotationally engaged with the second transmission input shaft,
   whenever the third shift element of the main transmission is engaged, the first transmission input shaft and the second transmission input shaft are rotationally engaged with each other, and
   whenever the fourth shift element of the main transmission is engaged, the loose gear of the third gear plane is rotationally engaged with the first transmission input shaft.

4. The transmission according to claim 1, wherein the first shift element and the second shift element of the main transmission are formed as a first double shift element,
   the third shift element and the fourth shift element of the main transmission are formed as a second double shift element,
   the fifth shift element and the sixth shift element of the main transmission are formed as a third double shift element,
   in a region of each of the double shift elements only one of the shift elements is always engaged or both shift elements of the respective double shift elements are disengaged.

5. The transmission according to claim 1, wherein the electric machine of the hybrid drive interconnection of an input planetary transmission can be rotationally engaged with the second transmission input shaft of the main transmission, or
   the electric machine of the hybrid drive can be directly rotationally engaged with the second transmission input shaft of the main transmission.

6. The transmission according to claim 5, wherein the input planetary transmission, located between the electric machine of the hybrid drive and the second transmission input shaft of the main transmission, has planetary elements which comprise a sun gear, a ring gear and a planetary carrier carrying planets,
   a first element of the input planetary transmission is permanently rotationally engaged with the second transmission input shaft of the main transmission; a second element of the input planetary transmission is permanently rotationally engaged with the electric machine, and
   a third element of the input planetary transmission is either permanently connected to the housing, or whenever a first shift element interacting with the first planetary transmission is engaged, is connected to the housing and, whenever a second shift element interacting with the input planetary transmission is engaged, is rotationally engaged with the first transmission input shaft of the main transmission.

7. The transmission according to claim 6, wherein the first and second shift elements, which interact with the input planetary transmission, are formed by a sixth double shift element, and only one of the shift elements of the sixth double shift elements is always engaged or both shift elements of the sixth double shift elements are disengaged.

8. The transmission according to claim 1, wherein a range group with an output planetary transmission and three shift elements are arranged downstream from the main transmission,
the output planetary transmission of the range group has planetary elements which comprise a sun gear, a ring gear and a planetary carrier carrying planets,
a first element of the output planetary transmission of the range group is permanently rotationally engaged with the output shaft of the main transmission, and
a second element of the planetary transmission of the range group is permanently rotationally engaged with an output shaft of the range group,
whenever a first shift element of the range group is engaged, the loose gear of the fifth gear plane, which serves as the output constant, is rotationally engaged with the output shaft of the range group,
whenever a second shift element of the range group is engaged, a third element of the output planetary transmission is connected to the housing,
whenever a third shift element of the range group is engaged, the third element of the planetary transmission is connected rotationally engaged with the output shaft of the range group.

9. The transmission according to claim 8, wherein
the seventh shift element and the eighth shift element of the main transmission are formed by a fourth double shift element, and the first shift element of the range group is configured as a single shift element, or
the seventh shift element of the main transmission is s single shift element and the eighth shift element of the main transmission and the first shift element of the range group are formed by a fourth double shift element,
wherein only one of the shift elements of the fourth double shift elements is always engaged or both shift elements of the fourth double shift elements are disengaged.

10. The transmission according to claim 8, wherein the second shift element and the third shift element of the range group are formed by a fifth double shift element, wherein only one of the shift elements of the fifth double shift element is engaged or both shift elements of the fifth double shift element are disengaged.

11. The transmission according to claim 1, wherein the main transmission is provided with a reverse gear plane by which a mechanical reverse gear can be realized.

12. A drive train for a hybrid vehicle, with a hybrid drive having an internal combustion engine and an electric machine and with a transmission according to claim 1.

13. The drive train according to claim 12, wherein the internal combustion engine is permanently coupled or releasably coupled, by a separating clutch, to the first transmission input shaft.

14. The method according to claim 13, wherein after disengaging the fifth shift element of the main transmission, shifting the range group by disengaging the second shift element of the range group and by engaging the third shift element of the range group.

15. A method for operating a drive train of a hybrid vehicle according to claim 12, for executing a gear change in an ISG operating mode, in which the third element of the planetary transmission, shifted between the electric machine of the hybrid drive and the second transmission input shaft of the main transmission, is connected to the housing, of a temporally highest gear when the second shift element of the range group is engaged in a highest gear when the second shift element of the range group is engaged, with the following steps:
first uncoupling the loose gear of the output constant of the output shaft of the main transmission by a load free disengagement of the eighth shift element of the main transmission,
actively synchroning the first shift element of the range group via the electric machine,
then engaging the first shift element of the range group and the second shift element of the main transmission is disengaged load free,
then actively synchronizing and engaging the first shift element of the main transmission via the electric machine,
then setting the internal combustion engine load free and disengaging the fifth shift element of the main transmission load free, and
then actively synchronizing and engaging the third shift element of the main transmission via the internal combustion engine.

16. A method for operating a drive train of a hybrid vehicle according to claim 12 for executing a gear change in an EDA operating mode, in which the third element of the input planetary transmission, connected between the electric machine of the hybrid drive and the second transmission input shaft of the main transmission, is connected rotationally engaged with the first transmission input shaft, of a temporally highest gear when the second shift element of the range group is engaged in a highest gear when the second shift element of the range group is engaged, comprising:
first uncoupling the loose gear of the output constant of the output shaft of the main transmission by a load free disengaging of the eighth shift element of the main transmission,
then actively synchronizing the first shift element of the range group via the electric machine,
then engaging the first shift element of the range group and disengaging the second shift element of the main transmission in a load free state,
then actively synchronizing and engaging the first shift element of the main transmission via the electric machine,
then setting torque provided by the internal combustion engine and the electrical machine such that the same are in proportion to a stationary transmission ratio of the input planetary transmission, which is shifted between the electric machine and the second transmission input shaft, as a result of which the fifth shift element of the main transmission is set load free and is disengaged load free,
then actively synchronizing and engaging the third shift element of the main transmission via the internal combustion engine and the electric machine.

17. The method according to claim 16, wherein after disengaging of the fifth shift element of the main transmission, shifting the range group by disengaging the second shift element of the range group and engaging the third shift element of the range group.

* * * * *